United States Patent [19]

Tsunefuji

[11] 4,115,790

[45] Sep. 19, 1978

[54] DEVICE FOR PREVENTING LEAKAGE CURRENT IN LIGHT RESPONSIVE CIRCUIT

[75] Inventor: Katsuhiko Tsunefuji, Hachioji, Japan

[73] Assignee: Olympus Optical Co., Ltd., Tokyo, Japan

[21] Appl. No.: 801,583

[22] Filed: May 31, 1977

[30] Foreign Application Priority Data

Jun. 7, 1976 [JP] Japan .................... 51/73844[U]

[51] Int. Cl.² ........................................... G03B 7/00
[52] U.S. Cl. ................................. 354/60 R; 307/91
[58] Field of Search .................. 354/60 R; 361/406; 250/239, 551; 307/91

[56] References Cited

U.S. PATENT DOCUMENTS

| 3,419,433 | 12/1968 | Slifer, Jr. ..................... 307/91 |
| 3,994,001 | 11/1976 | Maitani et al. ............... 354/60 R |

*Primary Examiner*—Russell E. Adams
*Attorney, Agent, or Firm*—Lerner, David, Littenberg & Samuel

[57] ABSTRACT

Device for preventing a leakage current in a light responsive circuit of a camera which includes a photoelectric transducer element is disclosed. The device comprises a shield line which is disposed in surrounding relationship with the circuit and to which is applied a potential of an equal magnitude as that of circuit voltage, thereby preventing disturbances which might occur as a result of a weak signal current being influenced by its own leakage or by other leakage current, to or from circuits of different potentials.

5 Claims, 3 Drawing Figures

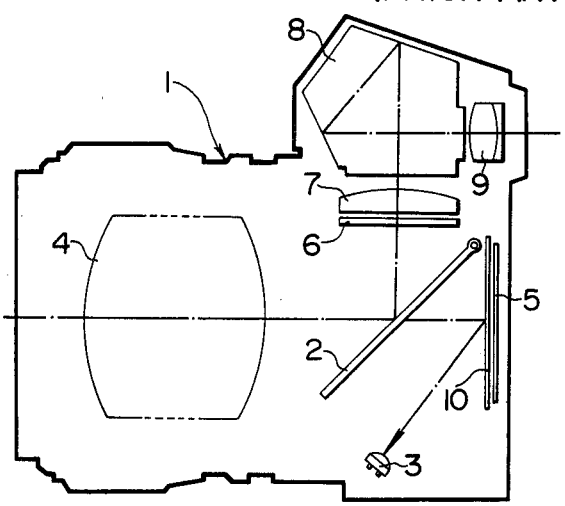
FIG. I (PRIOR ART)
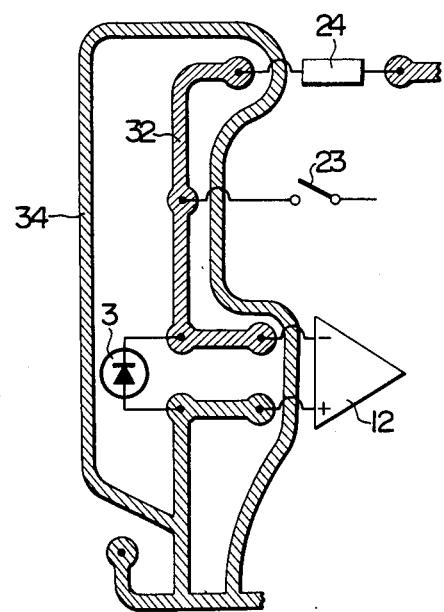
FIG. 3

DEVICE FOR PREVENTING LEAKAGE CURRENT IN LIGHT RESPONSIVE CIRCUIT

BACKGROUND OF THE INVENTION

The invention relates to a device for preventing a leakage current in a light responsive circuit, and more particularly, to a device which prevents disturbances to a weak signal current of the circuit which may be caused by its leakage to other circuits of different potentials or by a leakage current from the latter circuits.

A camera which utilizes an electrical shutter is usually provided with a printed circuit board, which forms the electrical circuit thereof. The printed circuit board is formed by a substrate of an electrically insulating material such as ceramic on which the circuit is printed in a pattern. Discrete components such as transistors, capacitors, resistors, IC elements are mounted on the substrate, while a photoelectric transducer element and electromagnet which are used for photometry and for constraining the second screen of the shutter, respectively, are connected with the circuit through lead wires. It will be thus seen that conductors of varying potentials exist on the printed circuit board. Though these conductors are electrically insulated from each other by the substrate, there is a leakage current flow across conductors of different potentials, which is on the order of pico-amperes where the insulation resistance of the substrate is $10^{12}$ ohms and the source voltage is 10 volts. If the signal current is of a magnitude which ranges from microamperes to milliamperes, no problem will be caused by the presence of such leakage current, which however present a serious problem when the magnitude of the signal current is weak enough to be comparable with the leakage current. This is the case in a single lens reflex camera of TTL photometry type where the photoelectric transducer of the electrical shutter senses reflected light from the shutter screen and film surface. The reflected light is so weak as to produce a signal current on the order of pico-amperes.

An example of electrical shutters of the type in which the photoelectric transducer senses reflected light from the film surface and the first screen of the shutter will be described below with reference to FIG. 1, which shows a conventional arrangement. As shown, a single lens reflex camera 1 of TTL photometry type includes a movable mirror 2, below which is disposed a photoelectric transducer 3 for photometry. As is recognized, light passing through a taking lens 4 is led to a film 5, and to a viewfinder system by the mirror 2. A focussing lens 6 is located at a conjugate position to the film 5. The optical system of the viewfinder additionally comprises a condenser lens 7, a pentaprism 8 and a eyepiece 9.

Screens of a focal plane shutter are disposed immediately in front of the film 5. A first screen of the shutter is shown at 10, and its surface facing toward the lens 4 is formed to present an optical reflectivity which is equivalent to that of the film surface so that during a photographing operation when the movable mirror 2 is raised to its upper position, the transducer 3 receives reflected light from the first screen 10 during the initial phase and thereafter receives reflected light from the film surface as the screen 10 runs to produce an exposure path in order to allow the shutter circuit to determine a proper exposure period automatically.

FIG. 2 shows the electrical shutter circuit including the transducer 3, which is conventional in itself. A substrate 11 of the printed circuit board is shown in phantom lines, and an electrical circuit is printed in a pattern thereon as shown. A number of discrete electrical components which cooperate with the circuit pattern to form the shutter circuit are mounted on the substrate 11, and include an operational amplifier 12 formed as an integrated circuit element, another integrated circuit element 17 which contains an integrator 13, comparison circuit 14, correction circuit 15 and limiter 16, a switching transistor 18, FET 19 which forms a constant voltage source, resistors 20, 21, 22, a trigger switch 23, and a capacitor 24. The substrate is also provided with a pair of terminal pins 25a, 25b across which is connected an electromagnet 26 for constraining the second screen of the shutter, in shunt with a capacitor 27 which bypasses any reverse e.m.f. The substrate is also provided with another terminal pin 28, and a series combination of a main switch 29 and a three volt battery 30 is connected across the terminal pins 28, 25b. A resistor, not shown, is connected across a further pair of terminal pins 31a, 31b for presetting a film speed.

The transducer 3 is connected across the input terminals of the operational amplifier 12, which is in turn connected with the integrator 13. The amplifier 12 provides a zero bias across the transducer, and forms a time constant circuit in combination with the transducer and the capacitor 24. When the trigger switch 23 is opened, the time constant circuit becomes effective to determine the exposure period. For stable operation of the time constant circuit, a voltage of one volt is applied to the positive input of the amplifier 12 from a contant voltage source comprising FET 19 and resistors 20, 21. Since the amplifier 12 functions together with the integrator 13 to provide a zero bias to the transducer, those conductors on the circuit board which are shown in thick lines in FIG. 2 are of the same potential as the positive input terminal of the amplifier 12, or one volt. It will be noted that these conductors represent an electrical path for a weak signal current from the transducer.

Thus it will be seen that there exist conductors of different potentials on the substrate 11, namely, 1V conductors through which the signal current flows and 0V and 3V conductors from the battery. The voltage difference between 1V and 3V conductors is two volts, and in one example, the resistance between these conductors is measured to be $10^{12}$ ohms. Thus a leakage current on the order of two pico-amperes will flow between them. This magnitude of the leakage current is comparable to the magnitude of a weak signal current which is produced by the transducer 3, since the reflected light from the film and screen surfaces is at a low level. Hence, the leakage current will have an adverse influence upon the signal current, precluding the acquisition of a correct photometric current. In particular, the flow of a leakage current into or out of the 1V conductor which connects the capacitor 24 with the transducer 3 will cause a large variation in the signal current, resulting in an upset exposure period.

SUMMARY OF THE INVENTION

It is an object of the invention to provide a device for preventing a leakage current in a light responsive circuit of a camera which includes a photoelectric transducer element wherein the light responsive circuit is surrounded by a shield line to which is applied a potential equal to the potential of the circuit thereby preventing disturbances caused to a weak signal current by its leakage to other circuits of different potentials or by a leakage current from other circuits of also different potentials.

BRIEF DESCRIPTION OF THE DRAWINGS

FIG. 1 is a schematic view of a single lens reflex camera employing an electrical shutter of TTL photometry type;

FIG. 3 is a plan view of a device for preventing a leakage current in a light responsive circuit constructed in accordance with one embodiment of the invention.

DESCRIPTION OF PREFERRED EMBODIMENT

Figure 2:
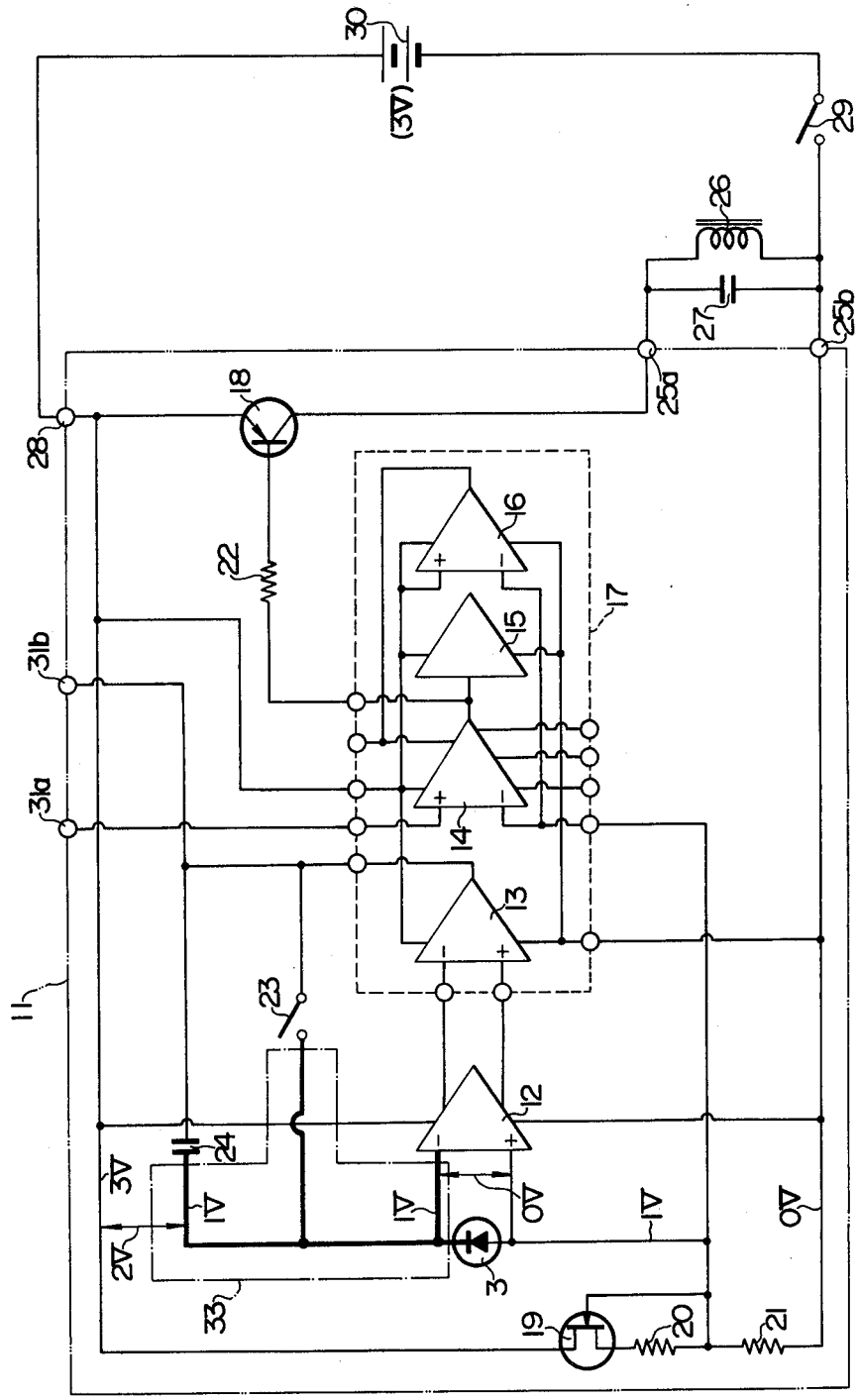
FIG. 2 is a circuit diagram of an exemplary shutter circuit.

Referring to FIG. 3, the device of the invention comprises a shield line formed by a printed pattern 34 which surrounds a printed pattern 32 constituting a light responsive circuit and to which the photoelectric transducer 3, capacitor 24 and trigger switch 23 are connected. It is to be noted that the patterns 32, 34 are printed on the substrate 11 shown in FIG. 2. The pattern 32 is shown in FIG. 2 by phantom line 33. A voltage of one volt which is equal to the potential of the light responsive circuit is applied to the printed pattern 34. The transducer 3, amplifier 12, trigger switch 23 and capacitor 24 which are electrically connected with the printed pattern 32 are mounted off the surface of the circuit board, so that the pattern 32 is completely isolated by the pattern 34 from other patterns on the circuit board including the 3V conductors.

Since the combination of the amplifier 12 and integrator 13 provides a zero bias across the terminals of the photoelectric transducer 3, the pattern 32 assumes the same potential as the positive input terminal of the amplifier 12. Thus when the shield line or the printed pattern 34 is connected with the positive input terminal of the amplifier 12, the patterns 32 and 34 assume the same potential, thus eliminating any current leakage to or out of the pattern 32. In this manner, adverse influence of leakage current upon the weak signal current is avoided, enabling a correct photometric current to be obtained. It is to be noted that any leakage current which may flow between the printed pattern 34 and the remainder of the shutter circuit having different potentials cannot affect the operation of the light responsive circuit.

What is claimed is:

1. A device for preventing a leakage current in a light responsive circuit of a camera including a photoelectric transducer element, the device comprising a shield line surrounding the light responsive circuit and to which is applied a potential equal to the potential of the light responsive circuit, thereby preventing disturbances to a weak signal current flowing through the light responsive circuit which may be caused by flow of a leakage current between the light responsive circuit and other circuits of different potentials.

2. A device according to claim 1 in which the shield line is formed by a printed pattern which surrounds another printed pattern constituting the light responsive circuit and to which the photoelectric transducer, an amplifier, a trigger switch and a capacitor are connected.

3. In a light responsive circuit for use in a camera and including a photoelectric transducer element, said circuit incorporating a printed circuit structure comprised of an insulating substrate having printed wiring in the form of conductive pattern arranged upon the substrate, said pattern including printing conductive wires for connecting the transducer element to associated circuit components, a shield for preventing weak signals from being effected by leakage currents flowing between the light responsive circuit and other circuits of different potentials, said shield comprising a closed path printed conductive pattern formed upon said substrate and surrounding the aforesaid printed wiring for connecting said transducer element to associated circuitry said printed wiring shield being electrically maintained at the electrical potential of the light responsive circuit.

4. The circuit arrangement of claim 3 wherein said transducer element is a discrete component having electrical leads connected to the aforesaid printing wiring.

5. The circuit arrangement of claim 3 wherein said associated circuitry includes printed wiring mounted upon said substrate;

electrical leads having their ends connected to the transducer connecting printed wiring and the associate circuitry printed wiring and having their intermediate portions extending over and spaced from the portion of the closed path shield therebetween.

* * * * *